US010523697B2

(12) United States Patent
Lee et al.

(10) Patent No.: US 10,523,697 B2
(45) Date of Patent: Dec. 31, 2019

(54) METHOD AND APPARATUS FOR DETECTING CYBERTHREATS THROUGH CORRELATION ANALYSIS

(71) Applicant: ELECTRONICS AND TELECOMMUNICATIONS RESEARCH INSTITUTE, Daejeon (KR)

(72) Inventors: Jong-Hoon Lee, Daejeon (KR); Ik-Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 228 days.

(21) Appl. No.: 15/823,209

(22) Filed: Nov. 27, 2017

(65) Prior Publication Data

US 2018/0191761 A1     Jul. 5, 2018

(30) Foreign Application Priority Data

Jan. 4, 2017    (KR) .................... 10-2017-0001183

(51) Int. Cl.
     *H04L 29/06*      (2006.01)
(52) U.S. Cl.
     CPC ...... *H04L 63/1425* (2013.01); *H04L 63/1433* (2013.01)
(58) Field of Classification Search
     CPC .................. H04L 63/1425; H04L 63/1433
(Continued)

(56) References Cited

U.S. PATENT DOCUMENTS

| 8,800,037 B2 | 8/2014 | Paek et al. |
| 2010/0024037 A1 | 1/2010 | Grzymala-Busse et al. |

(Continued)

FOREIGN PATENT DOCUMENTS

| KR | 10-0838799 B1 | 6/2008 |
| KR | 10-1039717 B1 | 6/2011 |

(Continued)

OTHER PUBLICATIONS

Kakavand et al., "A Text Mining-based Anomaly Detection Model in Network Security", Double Blind Peer Reviewed International Research Journal, vol. 14 Issue 5 Version 1.0 Year 2014, pp. 22-32, Global Journals Inc. (USA), Global Journal of Computer Science and Technology: G Interdisciplinary, Online ISSN: 0975-4172 and Print ISSN: 0975-4350.

*Primary Examiner* — Longbit Chai

(57) ABSTRACT

Disclosed is a method for detecting a cyberthreat through correlation analysis of security events, which includes extracting a false-positive data set by extracting, from source data, information about security events occurring during a predetermined time period based on a time at which erroneous detection occurred; extracting a true-positive data set by extracting, from the source data, information about security events occurring during the predetermined time period based on a time at which an intrusion threat was correctly detected; extracting a current data set by extracting information about security events occurring during the predetermined time period from data to be analyzed; generating event coincidence statistics by extracting a frequency of each security event in the respective data sets and by compiling statistics thereon; generating an event vector based on the event coincidence statistics; and performing intrusion threat detection through a vector space model based on the event vector.

14 Claims, 7 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2011/0144916 A1* | 6/2011 | Keck | ...................... | G16B 40/00 702/19 |
| 2013/0318609 A1 | 11/2013 | Kim et al. | | |
| 2018/0309772 A1 | 10/2018 | Song et al. | | |

FOREIGN PATENT DOCUMENTS

| KR | 10-1113615 B1 | 2/2012 |
|---|---|---|
| KR | 10-2016-0089800 A | 7/2016 |
| KR | 101689296 B1 | 12/2016 |

\* cited by examiner

METHOD AND APPARATUS FOR DETECTING CYBERTHREATS THROUGH CORRELATION ANALYSIS

CROSS REFERENCE TO RELATED APPLICATION

This application claims the benefit of Korean Patent Application No. 10-2017-0001183, filed Jan. 4, 2017, which is hereby incorporated by reference in its entirety into this application.

BACKGROUND OF THE INVENTION

1. Technical Field

The present invention relates generally to a method and apparatus for detecting cyberthreats through correlation analysis of security events. More particularly, the present invention relates to a method and apparatus for detecting a cyberthreat through correlation analysis of security events, through which the number of events that need to be manually analyzed by security experts may be reduced by increasing the number of cases that are automatically determined by a control solution.

2. Description of the Related Art

In the case of current intelligent cyber-targeted attacks, attackers use various unknown attack techniques over a long period of time, which presents considerable threats to the networks of companies and organizations. Accordingly, various security systems and solutions for detecting such intelligent cyberattacks are being developed. When an attack, such as a DDoS attack, port scanning, an attempt to break into computers, or the like, occurs, an Intrusion Detection System (IDS) and an Intrusion Prevention System (IPS) detect such an attack based on rules and generate a security event, and the security event is analyzed in a security control center, whereby the occurrence of an intrusion threat is recognized.

Control solutions used in most security control centers automatically detect intrusion threats by performing filtering, scenario analysis, effect analysis, and the like on collected source security events. Alternatively, after events that need to be analyzed are detected, the events are manually analyzed by security experts who work in the security control centers. However, general control solutions are problematic in that vast amounts of security events are generated in the IDS/IPS and even analysis that is manually performed by security experts occasionally results in erroneous detection.

In this regard, Korean Patent Application Publication No. 10-2016-0089800 discloses 'Apparatus and method for investigating cyber-incidents'.

SUMMARY OF THE INVENTION

An object of the present invention is to automatically determine whether an intrusion threat occurs. That is, the present invention intends to reduce the number of events that need to be manually analyzed by security experts by raising the probability of automatic determination by a control solution.

In order to accomplish the above object, a method for detecting a cyberthreat through correlation analysis of security events according to an embodiment of the present invention includes extracting a false-positive data set by extracting, from source data, information about security events that occurred during a predetermined unit time period based on a time at which erroneous detection occurred; extracting a true-positive data set by extracting, from the source data, information about security events that occurred during the predetermined unit time period based on a time at which an intrusion threat was correctly detected; extracting a current data set by extracting information about security events that occurred during the predetermined unit time period from data to be analyzed; generating event coincidence statistics by extracting a frequency of each security event respectively in the false-positive data set, the true-positive data set, and the current data set and by compiling statistics thereon; generating an event vector based on the event coincidence statistics; and performing intrusion threat detection using a vector space model based on the event vector.

Here, extracting the current data set may include extracting security events that occurred during the predetermined unit time period from the data to be analyzed; and identifying times at which the security events occurred and names of the security events, extracting information about the security events from the data to be analyzed, and thereby extracting the current data set.

Here, generating the event vector may be configured to generate the event vector through data normalization of the event coincidence statistics.

Here, generating the event vector may be configured to generate the event vector through data normalization through which a TF-IDF value is calculated from the event coincidence statistics using a Term Frequency (TF), which represents a frequency of each security event in each data set, and an Inverse Document Frequency (IDF), which represents a frequency of each security event in an entire data set.

Here, the TF-IDF value may be calculated by multiplying the TF, which represents the frequency of each security event in each data set, by the IDF, which represents the frequency of each security event in the entire data set.

Here, performing the intrusion threat detection may be configured to perform the intrusion threat detection based on long-term event correlation analysis through the vector space model of the event vector.

Here, performing the intrusion threat detection may be configured to perform the intrusion threat detection by calculating a similarity between an event vector of the current data set and event vectors of the false-positive data set and of the true-positive data set and by comparing the similarity with a preset threshold.

Also, in order to accomplish the above object, an apparatus for detecting a cyberthreat through correlation analysis of security events according to an embodiment of the present invention includes a false-positive data set extraction unit for extracting a false-positive data set by extracting, from source data, information about security events that occurred during a predetermined unit time period based on a time at which erroneous detection occurred; a true-positive data set extraction unit for extracting a true-positive data set by extracting, from the source data, information about security events that occurred during the predetermined unit time period based on a time at which an intrusion threat was correctly detected; a current data set extraction unit for extracting a current data set by extracting information about security events that occurred during the predetermined unit time period from data to be analyzed; an event coincidence statistics extraction unit for generating event coincidence statistics by extracting a frequency of each security event respectively in the false-positive data set, the true-positive data set, and the current data set and by compiling statistics thereon; an event vector generation unit for generating an event vector based on the event coincidence statistics; and an intrusion threat determination unit for performing intrusion threat detection through a vector space model based on the event vector.

Here, the current data set extraction unit may include an event extraction unit for extracting security events that occurred during the predetermined unit time period from the data to be analyzed; and an event-text parser for identifying times at which the security events occurred and names of the security events and extracting information about the security events from the data to be analyzed, thereby extracting the current data set.

Here, the event vector generation unit may generate the event vector through data normalization of the event coincidence statistics.

Here, the event vector generation unit may generate the event vector through data normalization through which a TF-IDF value is calculated from the event coincidence statistics based on a Term Frequency (TF), which represents a frequency of each security event in each data set, and on an Inverse Document Frequency (IDF), which represents a frequency of each security event in an entire data set.

Here, the TF-IDF value may be calculated by multiplying the TF, which represents the frequency of each security event in each data set, by the IDF, which represents the frequency of each security event in the entire data set.

Here, the intrusion threat determination unit may perform the intrusion threat detection based on long-term event correlation analysis through the vector space model of the event vector.

Here, the intrusion threat determination unit may perform the intrusion threat detection by calculating a similarity between an event vector of the current data set and event vectors of the false-positive data set and of the true-positive data set and by comparing the similarity with a preset threshold.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
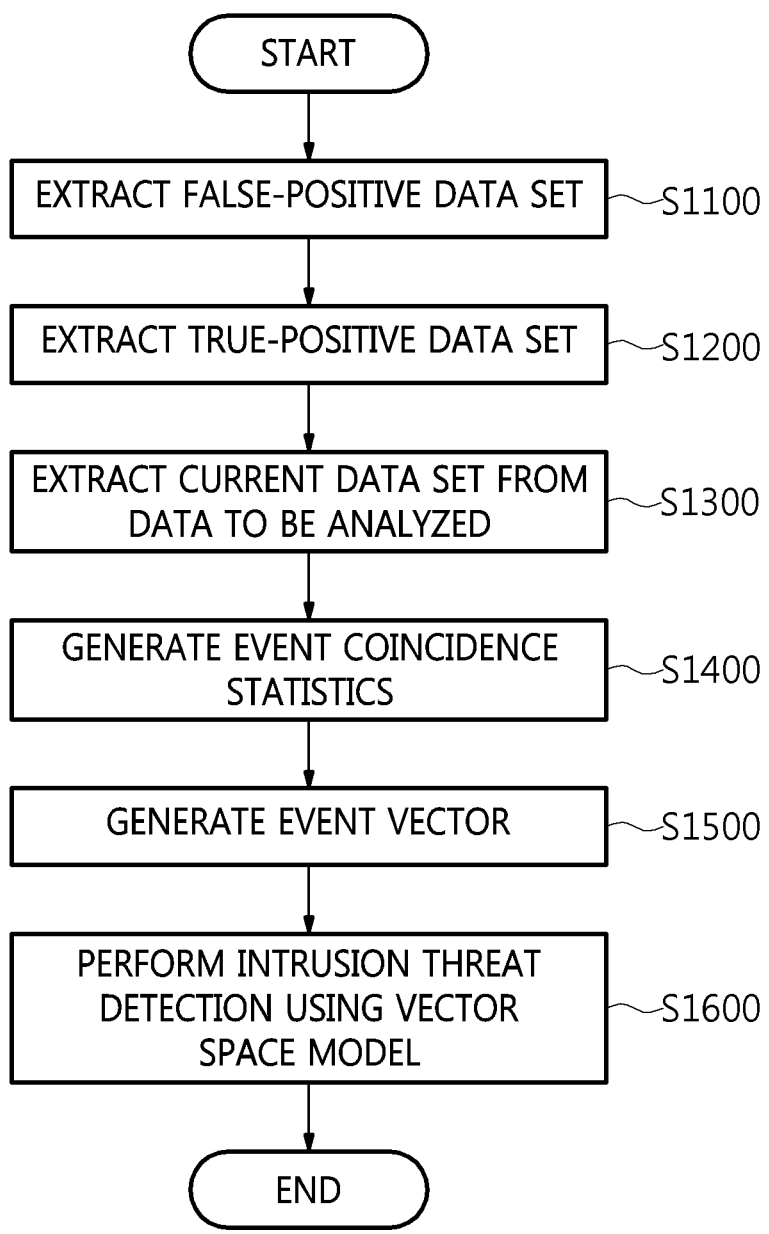
FIG. 1 is a flowchart for explaining a method for detecting a cyberthreat through the correlation analysis of security events according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a method for detecting a cyberthreat through the correlation analysis of security events according to an embodiment of the present invention will be described.

FIG. 1 is a flowchart for explaining a method for detecting a cyberthreat through the correlation analysis of security events according to an embodiment of the present invention.

Referring to FIG. 1, in the method for detecting a cyberthreat through the correlation analysis of security events according to an embodiment of the present invention, first, information about security events that occurred during a predetermined unit time period based on the time at which erroneous detection occurred is extracted from source data, whereby a false-positive data set is extracted at step S1100. Also, information about security events that occurred during the predetermined unit time period based on the time at which an intrusion threat was correctly detected is extracted from the source data, whereby a true-positive data set is extracted at step S1200.

Then, information about security events that occurred during the predetermined unit time period is extracted from data to be analyzed, whereby a current data set is extracted at step S1300. Here, step S1300 may include the step of extracting security events that occurred during the predetermined unit time period from the data to be analyzed and the step of identifying times at which the security events occurred and the names of the security events and extracting information about the security events from the data to be analyzed, thereby extracting the current data set.

Then, event coincidence statistics are generated at step S1400 by extracting the respective frequency of each of the security events in the false-positive data set, the true-positive data set, and the current data set and by compiling statistics thereon.

Then, an event vector is generated at step S1500 based on the event coincidence statistics generated at step S1400. Here, at step S1500, the event vector is generated through data normalization of the event coincidence statistics. Also, at step S1500, the event vector may be generated through data normalization through which a TF-IDF value is calculated from the event coincidence statistics using a Term Frequency (TF), which represents the frequency of each of the security events in each data set, and an Inverse Document Frequency (IDF), which represents the frequency of each of the security events in the entire data set. Here, the TF-IDF value may be calculated by multiplying the TF, which represents the frequency of each of the security events in each data set, by the IDF, which represents the frequency of each of the security events in the entire data set.

Then, intrusion threat detection is performed at step S1600 using the vector space model based on the event vector generated at step S1500. Here, at step S1600, intrusion threat detection may be performed based on long-term event correlation analysis using the vector space model of the event vector. Also, at step S1600, intrusion threat detection may be performed by calculating the similarity between the event vector of the current data set and the event vectors of the false-positive data set and of the true-positive data set and by comparing the similarity with a preset threshold.

The above-described method for detecting a cyberthreat through the correlation analysis of security events according to the present invention may be implemented as program instructions executable by various computer devices, and may be recorded in computer-readable storage media. The computer-readable storage media may separately or collectively include program instructions, data files, data structures, and the like. The program instructions recorded in the media may be specially designed and configured for the embodiment, or may be available by being well known to computer software experts. Examples of the computer-readable storage media include magnetic media such as a hard disk, a floppy disk and a magnetic tape, optical media such as a CD-ROM and a DVD, magneto-optical media such as a floptical disk, ROM, RAM, flash memory, and the like, that is, a hardware device specially configured to store and execute program instructions. Examples of the program instructions include not only machine code made by a compiler but also high-level language code executable by a computer using an interpreter. The above-mentioned hardware device may be configured such that it operates as one or more software modules in order to perform the operations of the embodiment, and vice-versa.

The principles of the present invention may be implemented in a combination of hardware and software. Moreover, the software may be implemented as an application program tangibly embodied on a program storage unit. The application program may be uploaded to, and executed by, a machine comprising any suitable architecture. The machine may be implemented on a computer platform having hardware such as one or more Central Processing Units (CPUs), a computer processor, Random Access Memory (RAM), and input/output (I/O) interfaces. The computer platform may also include an operating system and microinstruction code. The various processes and functions described herein may be a part of the microinstruction code, a part of the application program, or any combination thereof, which may be executed by various processing devices including a CPU. Additionally, various peripheral devices, such as an additional data storage unit and a printer, may be connected to the computer platform.

It is to be further understood that, because some of the constituent system components and methods depicted in the accompanying drawings are preferably implemented in software, the actual connections between the system components or the process function blocks may differ depending upon the manner in which the present invention is programmed. Given the principles described herein, those skilled in the pertinent art will be able to contemplate these implementations and implementations similar thereto or configurations of the present invention without departing from the spirit and scope of the present invention.

Hereinafter, the configuration and operation of an apparatus for detecting a cyberthreat through the correlation analysis of security events according to an embodiment of the present invention will be described.

Figure 2:
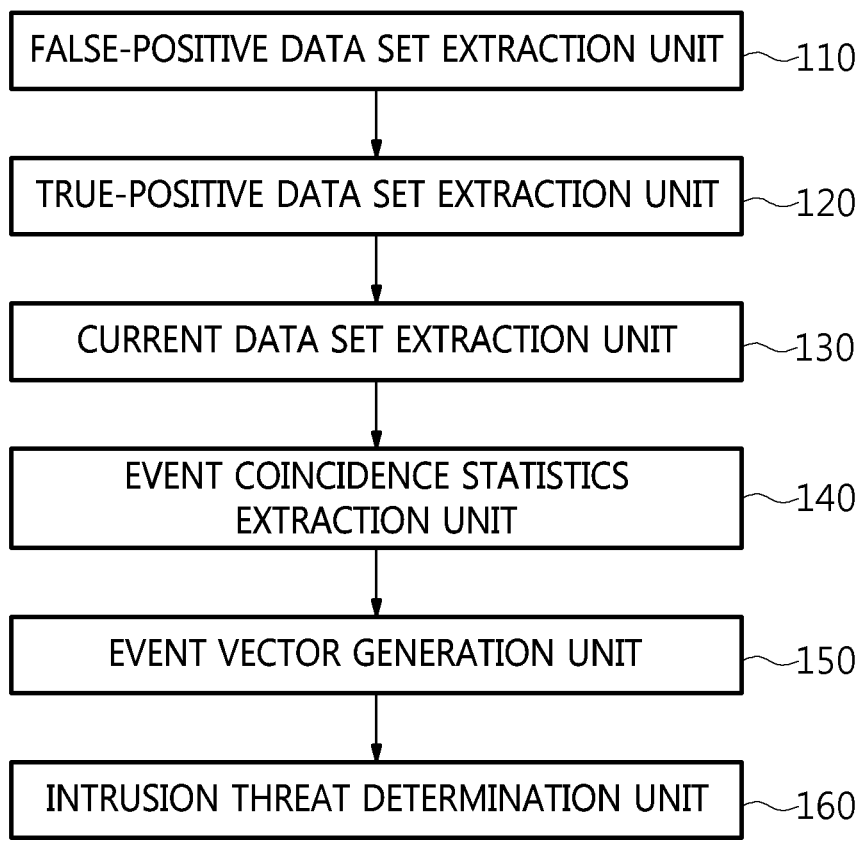
FIG. 2 is a block diagram that shows the configuration of an apparatus for detecting a cyberthreat through the correlation analysis of security events according to an embodiment of the present invention.

FIG. 2 is a block diagram that shows the configuration of an apparatus for detecting a cyberthreat through the correlation analysis of security events according to an embodiment of the present invention.

Referring to FIG. 2, the apparatus 100 for detecting a cyberthreat through the correlation analysis of security events according to an embodiment of the present invention may include a false-positive data set extraction unit 110, a true-positive data set extraction unit 120, a current data set extraction unit 130, an event coincidence statistics extraction unit 140, an event vector generation unit 150, and an intrusion threat determination unit 160.

The false-positive data set extraction unit 110 extracts a false-positive data set by extracting, from source data, information about security events that occurred during a predetermined unit time period based on the time at which erroneous detection occurred.

The true-positive data set extraction unit 120 extracts a true-positive data set by extracting, from the source data, information about security events that occurred during the predetermined time period based on the time at which an intrusion threat was correctly detected.

The current data set extraction unit 130 extracts a current data set by extracting information about security events that occurred during the predetermined unit time period from data to be analyzed. Also, the current data set extraction unit 130 may include an event extraction unit (not illustrated) for extracting security events that occurred during the predetermined unit time period from the data to be analyzed and an event-text parser (not illustrated) for identifying the times at which the security events occurred and the names of the security events and extracting information about the security events from the data to be analyzed, thereby extracting the current data set.

The event coincidence statistics extraction unit 140 generates event coincidence statistics by extracting the frequency of each of the security events respectively in the false-positive data set, the true-positive data set, and the current data set and by compiling statistics thereon.

The event vector generation unit 150 generates an event vector based on the event coincidence statistics. The event vector generation unit 150 may generate the event vector through data normalization of the event coincidence statistics. Also, the event vector generation unit 150 may generate the event vector through data normalization, through which a TF-IDF value is calculated from the event coincidence statistics using a Term Frequency (TF), which represent the frequency of each of the security events in each data set, and an Inverse Document Frequency (IDF), which represents the frequency of each of the security events in the entire data set. Here, the TF-IDF value may be calculated by multiplying the TF, which represents the frequency of each of the security events in each data set, by the IDF, which represents the frequency of each of the security events in the entire data set.

The intrusion threat determination unit 160 performs intrusion threat detection using the vector space model based on the event vector. Also, the intrusion threat determination unit 160 may perform intrusion threat detection based on long-term event correlation analysis using the vector space model of the event vector. Also, the intrusion threat determination unit 160 performs intrusion threat detection by calculating the similarity between the event vector of the current data set and the event vectors of the false-positive data set and of the true-positive data set and by comparing the similarity with a preset threshold.

Hereinafter, the method for detecting a cyberthreat through the correlation analysis of security events according to an embodiment of the present invention will be described in more detail.

Figure 3:
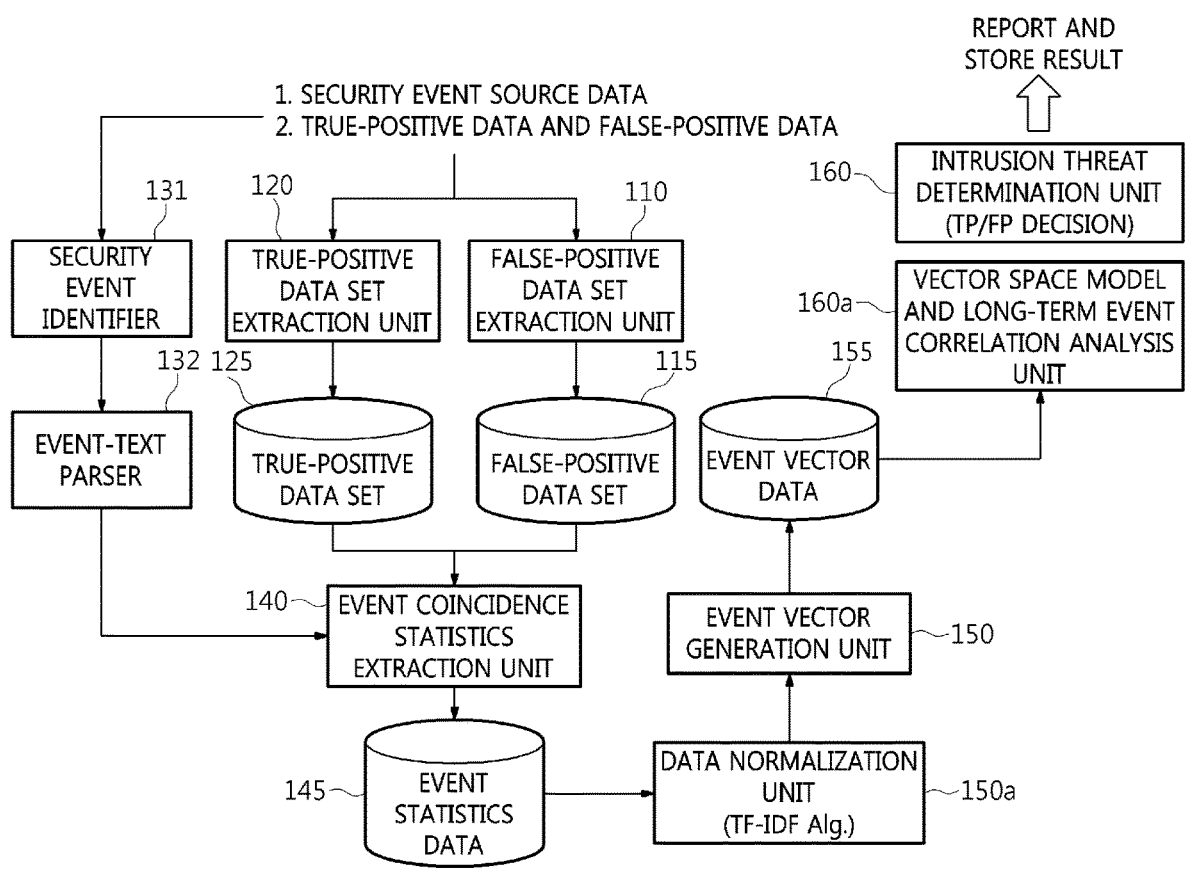
FIG. 3 is a view for more specifically explaining a security event analysis process in the method for detecting a cyberthreat through the correlation analysis of security events according to an embodiment of the present invention.

FIG. 3 is a view for more specifically explaining a security event analysis process in the method for detecting a cyberthreat through the correlation analysis of security events according to an embodiment of the present invention.

FIG. 3 shows a process chart of a security event analysis process according to the present invention. Components used in the security event analysis process include a security event identifier 131 for identifying the name of a security event, an event-text parser 132 for extracting the name of a security event and the time at which the security event occurred from the security event, a true-positive data set extraction unit 120 for collecting a set of security events that occurred during a unit time period (for example, from 5 minutes before an incident to 5 minutes thereafter) based on the time at which an intrusion threat was correctly detected, a true-positive data set 125, a false-positive data set extraction unit 110 for collecting a set of security events that occurred during the unit time period based on the time at which erroneous detection occurred, and a false-positive data set 115. Also, the event coincidence statistics extraction unit 140, for extracting the frequency of an event common to the current data set (not illustrated), the true-positive data set 125, and the false-positive data set 115, event statistics data 145 in which the extracted information is stored, a data normalization unit 150a for calculating a TF-IDF value from the event statistics data 145, an event vector generation unit 150 for generating an event vector through data normalization, event vector data 155 in which the generated event vector is stored, a long-term event correlation analysis unit 160a for performing long-term event correlation analysis using the vector space model of the generated event vector data, and an intrusion threat determination unit 160 for finally detecting an intrusion threat may be further included. Here, the security event analysis process may include modifying an algorithm used therein.

Figure 4:
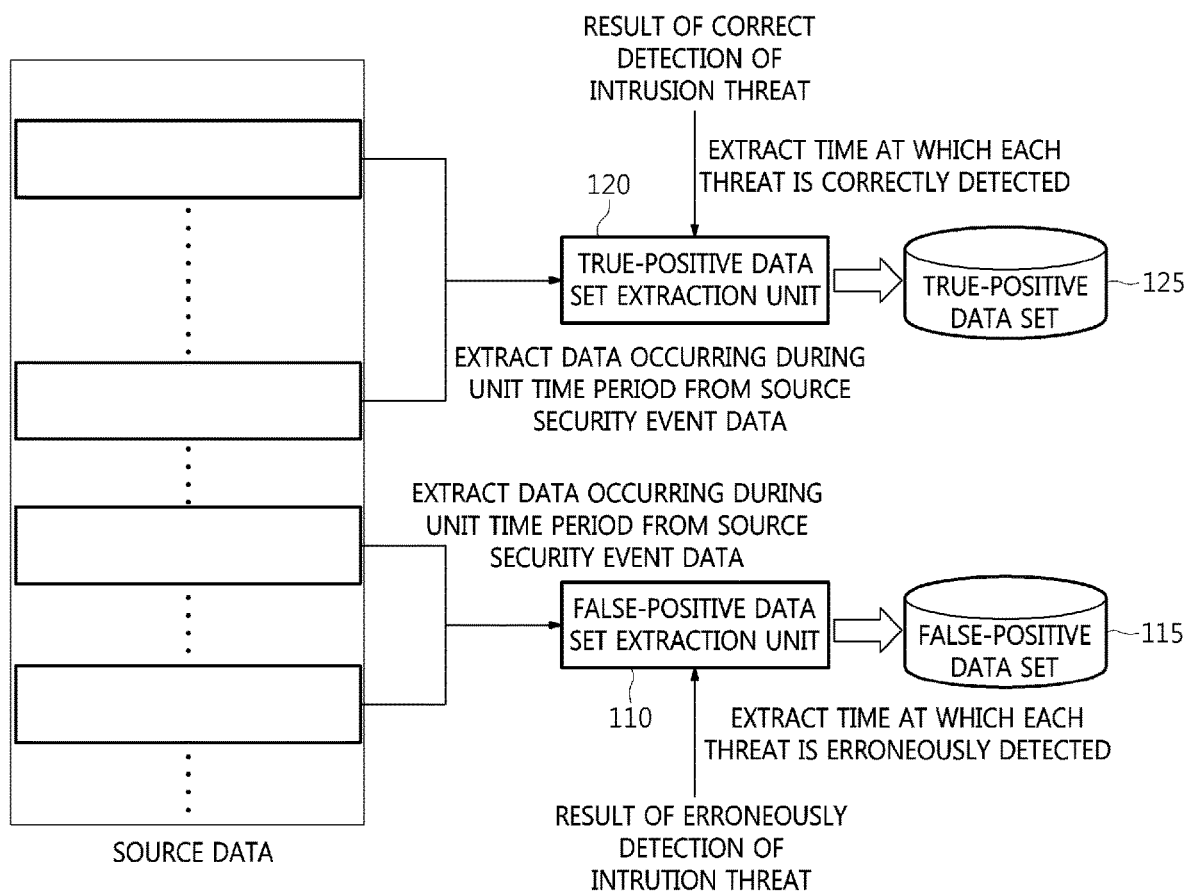
FIG. 4 is a view for more specifically explaining the process of extracting a true-positive data set and a false-positive data set in the method for detecting a cyberthreat through the correlation analysis of security events according to an embodiment of the present invention.

FIG. 4 is a view for more specifically explaining the process of extracting a true-positive data set and a false-positive data set in the method for detecting a cyberthreat through the correlation analysis of security events according to an embodiment of the present invention.

FIG. 4 is a process chart that shows the process of extracting data in order to form a true-positive data set and a false-positive data set. Specifically, information about security events that occurred during a unit time period based on the time at which an intrusion threat occurred (for example, from 2 minutes before to 2 minutes after the occurrence of the intrusion threat) is extracted from source data and is then stored. The true-positive data set extraction unit 120 extracts, from source data, all security events that occurred during a unit time period based on each time at which an intrusion threat was correctly detected, generates a true-positive data set 125 from the extracted security events, and stores the same in a DB. Similarly, the false-positive data set extraction unit 110 extracts, from the source data, all security events that occurred during the unit time period based on each time at which erroneous detection occurred, generates a false-positive data set 115 from the extracted security events, and stores the same in a DB.

Figure 5:
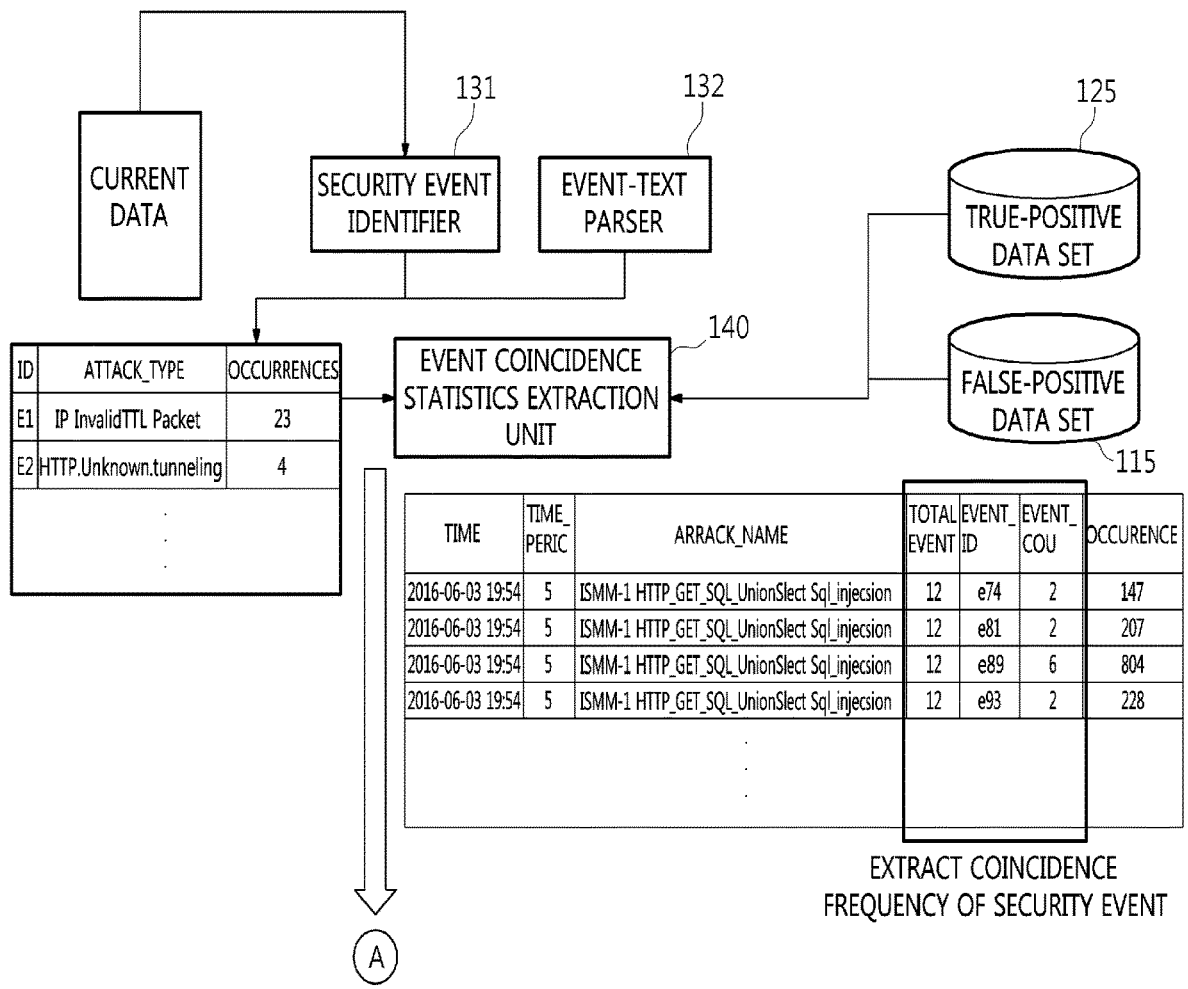
FIG. 5 and FIG. 6 are views for more specifically explaining the process of generating an event vector in the method for detecting a cyberthreat through the correlation analysis of security events according to an embodiment of the present invention.
Figure 6:
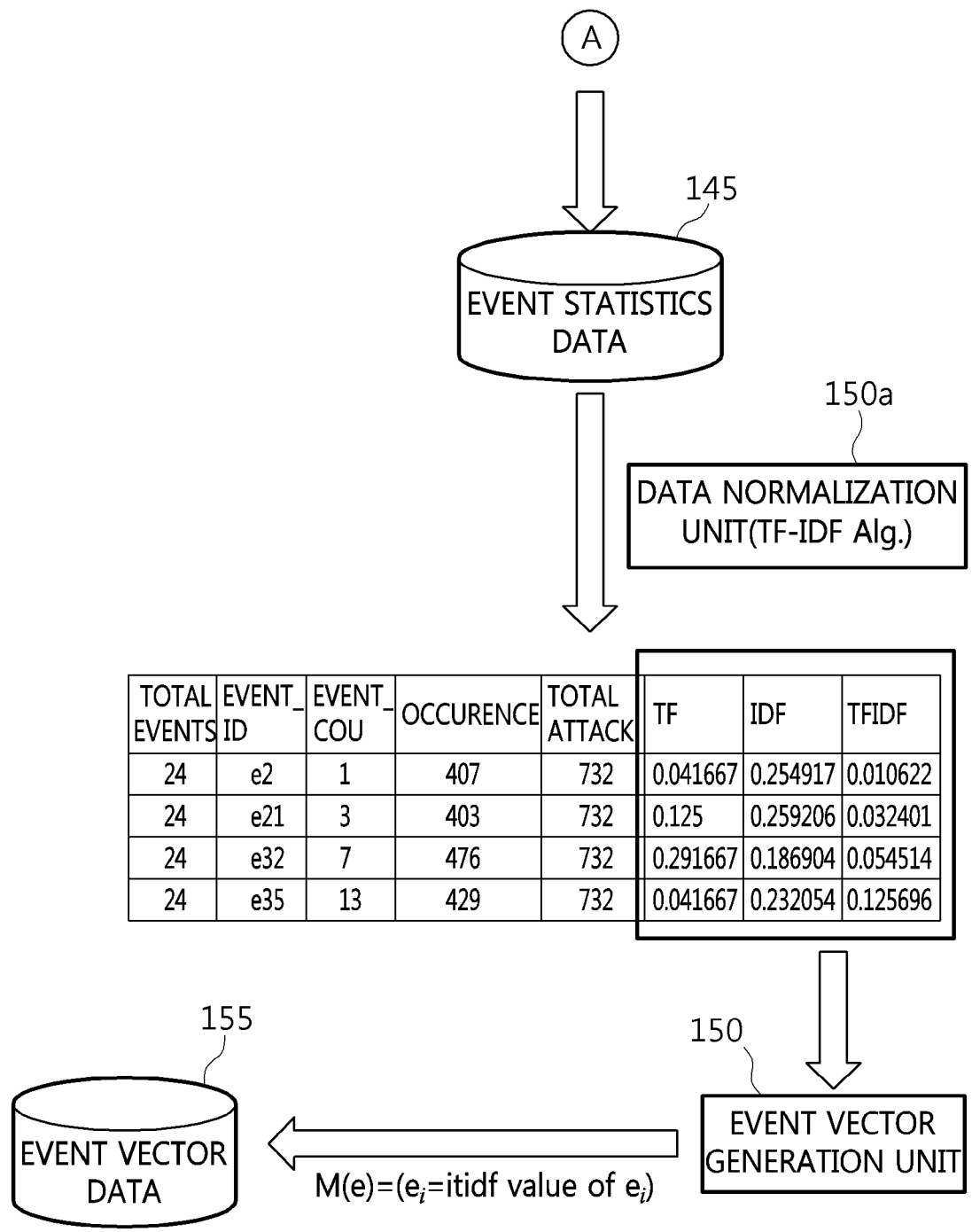

FIG. 5 and FIG. 6 are views for more specifically explaining the process of generating an event vector in the method for detecting a cyberthreat through the correlation analysis of security events according to an embodiment of the present invention.

Referring to FIG. 5 and FIG. 6, first, data are aggregated for each unit time period by collecting events in real time, and event parsers are assigned in order to parse the set of aggregated data. The event-text parser 132 and the security event identifier 131 parse data in each data set and extract the times at which events occurred and event names from the source data.

For each of the security events that occurred during a unit time period, the event coincidence statistics extraction unit 140 calculates the frequency of a security event and the number of data sets including the security event by executing a routine for counting the occurrences of each event in extracted data, such as the current data set, the false-positive data set 115, and the true-positive data set 125, and stores the results as the event statistics data 145. Then, the data normalization unit 150a generates a TF-IDF value of each security event for each data set by applying a TF-IDF algorithm and stores the TF-IDF value. The TF-IDF algorithm is an algorithm for calculating a correlation between a specific term and a document, and the TF-IDF algorithm is applied after replacing a term and a document with an event name and a data set of the unit time period, respectively. In the TF-IDF algorithm, a Term Frequency (TF) represents how often each event appears in each data set, an Inverse Document Frequency (IDF) represents how often each event appears in the entire data set, and a TF-IDF value is calculated by multiplying the TF by the IDF. That is, the TF may be [the number of times a security event 't' occurred/the total number of security events that occurred], the IDF may be [log (the total number of data sets/the number of data sets including the security event T)], and the TF-IDF may be [TF*IDF].

For the value generated through the above-described process, the event vector generation unit 150 generates a vector of the TF-IDF value for the name of an event that appears in each data set, and stores the vector as event vector data 155. The vector may have as many dimensions as the total number of types of events. For example, when there are 10 types of events, when TF-IDF of e_1 is 0.8, and when TF-IDF of e_7 is 0.4, the event vector may be described as ei={e1, e2, e3, e4, e5, e6, e7, e8, e9, e10}={0.8, 0, 0, 0, 0, 0, 0.4, 0, 0, 0}, and the event vector is stored in the event vector data. The long-term event correlation analysis unit calculates a cosine similarity between the event vector of the data set including the event that is currently being analyzed and the event vectors of the case in which erroneous detection occurred and of the case in which an intrusion threat was correctly detected in order to acquire the correlation therebetween, and sorts past event vectors having similarity greater than a preset threshold. Then, based on the distribution of true-positive data and false-positive data in the sorted events, the intrusion threat determination unit determines whether the event currently being analyzed was detected correctly or erroneously. For example, the number of times the similarity between the event vector that is currently being analyzed and that of the true-positive data set exceeds a threshold, the number of times the similarity between the corresponding event vector and the event vector of the false-positive data set exceeds the threshold, and a weight for the importance and the sequence of an event are collectively considered, whereby whether an intrusion threat is detected correctly or erroneously is determined.

Figure 7:
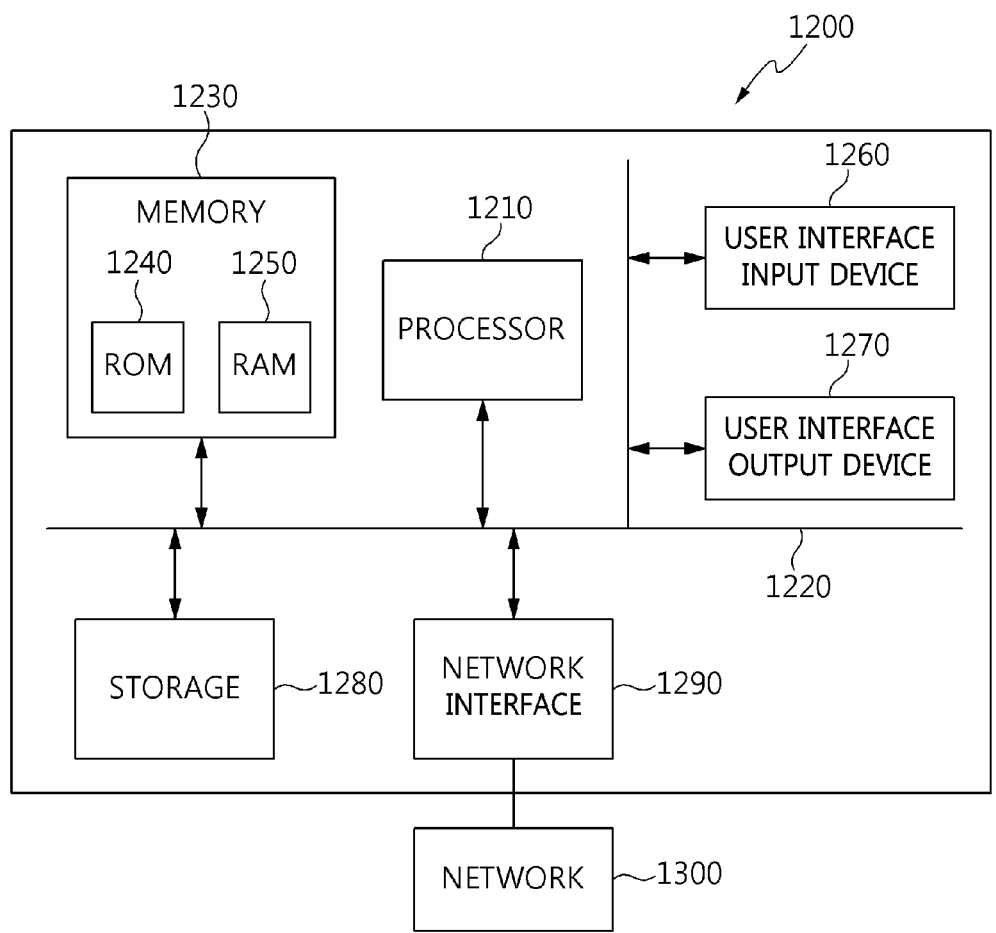
FIG. 7 is an embodiment of the present invention implemented in a computer system.

FIG. 7 is an embodiment of the present invention implemented in a computer system, e.g., as a computer readable medium. As shown in in FIG. 7, a computer system 1200 may include one or more of a processor 1210, a memory 1230, a user input device 1260, a user output device 1270, and a storage 1280, each of which communicates through a bus 1220. The computer system 1200 may also include a network interface 1290 that is coupled to a network 1300. The processor 1210 may be a central processing unit (CPU) or a semiconductor device that executes processing instructions stored in the memory 1230 and/or the storage 1280. The memory 1230 and the storage 1280 may include various forms of volatile or non-volatile storage media. For example, the memory may include a read-only memory (ROM) 1240 and a random access memory (RAM) 1250.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the present invention, whether an intrusion threat occurs may be automatically determined. That is, the present invention may increase the probability of automatic determination by a control solution, and may thereby decrease the number of events that need to be manually analyzed by security experts.

As described above, the method and apparatus for detecting a cyberthreat through the correlation analysis of security events according to the present invention are not limitedly applied to the configurations and operations of the above-described embodiments, but all or some of the embodiments may be selectively combined and configured, so that the embodiments may be modified in various ways.

What is claimed is:

1. A method for detecting a cyberthreat through correlation analysis of security events, comprising:
    extracting a false-positive data set by extracting, from source data, information about security events that occurred during a predetermined unit time period based on a time at which erroneous detection occurred;
    extracting a true-positive data set by extracting, from the source data, information about security events that occurred during the predetermined unit time period based on a time at which an intrusion threat was correctly detected;
    extracting a current data set by extracting information about security events that occurred during the predetermined unit time period from data to be analyzed;
    generating event coincidence statistics by extracting a frequency of each security event respectively in the false-positive data set, the true-positive data set, and the current data set and by compiling statistics thereon;
    generating an event vector through data normalization based on the event coincidence statistics; and
    performing intrusion threat detection using a vector space model based on the generated event vector and a predetermined similarity threshold.

2. The method of claim 1, wherein extracting the current data set comprises:
    extracting security events that occurred during the predetermined unit time period from the data to be analyzed; and
    identifying times at which the security events occurred and names of the security events, extracting information about the security events from the data to be analyzed, and thereby extracting the current data set.

3. The method of claim 1, wherein generating the event vector is configured to generate the event vector through data normalization of the event coincidence statistics.

4. The method of claim 3, wherein generating the event vector is configured to generate the event vector through data normalization through which a TF-IDF value is calculated from the event coincidence statistics using a Term Frequency (TF), which represents a frequency of each security event in each data set, and an Inverse Document Frequency (IDF), which represents a frequency of each security event in an entire data set.

5. The method of claim 4, wherein the TF-IDF value is calculated by multiplying the TF, which represents the frequency of each security event in each data set, by the IDF, which represents the frequency of each security event in the entire data set.

6. The method of claim 1, wherein performing the intrusion threat detection is configured to perform the intrusion threat detection based on long-term event correlation analysis through the vector space model of the event vector.

7. The method of claim 1, wherein performing the intrusion threat detection is configured to perform the intrusion threat detection by calculating a similarity between an event vector of the current data set and event vectors of the false-positive data set and of the true-positive data set and by comparing the similarity with a preset threshold.

8. An apparatus for detecting a cyberthreat through correlation analysis of security events, comprising:
    a hardware processor;
    a false-positive data set extraction unit for extracting, by the hardware processor, a false-positive data set by extracting, from source data, information about security events that occurred during a predetermined unit time period based on a time at which erroneous detection occurred;
    a true-positive data set extraction unit for extracting, by the hardware processor, a true-positive data set by extracting, from the source data, information about security events that occurred during the predetermined unit time period based on a time at which an intrusion threat was correctly detected;
    a current data set extraction unit for extracting, by the hardware processor, a current data set by extracting information about security events that occurred during the predetermined unit time period from data to be analyzed;
    an event coincidence statistics extraction unit for generating, by the hardware processor, event coincidence statistics by extracting a frequency of each security event respectively in the false-positive data set, the true-positive data set, and the current data set and by compiling statistics thereon;
    an event vector generation unit for generating, by the hardware processor, an event vector through data normalization based on the event coincidence statistics; and
    an intrusion threat determination unit for performing intrusion threat detection, by the hardware processor, through a vector space model based on the generated event vector and a predetermined similarity threshold.

9. The apparatus of claim 8, wherein the current data set extraction unit comprises:
    an event extraction unit for extracting security events that occurred during the predetermined unit time period from the data to be analyzed; and
    an event-text parser for identifying times at which the security events occurred and names of the security events and extracting information about the security events from the data to be analyzed, thereby extracting the current data set.

10. The apparatus of claim 8, wherein the event vector generation unit generates the event vector through data normalization of the event coincidence statistics.

11. The apparatus of claim 10, wherein the event vector generation unit generates the event vector through data normalization through which a TF-IDF value is calculated from the event coincidence statistics based on a Term Frequency (TF), which represents a frequency of each security event in each data set, and on an Inverse Document Frequency (IDF), which represents a frequency of each security event in an entire data set.

12. The apparatus of claim 11, wherein the TF-IDF value is calculated by multiplying the TF, which represents the frequency of each security event in each data set, by the IDF, which represents the frequency of each security event in the entire data set.

13. The apparatus of claim 8, wherein the intrusion threat determination unit performs the intrusion threat detection based on long-term event correlation analysis through the vector space model of the event vector.

14. The apparatus of claim 8, wherein the intrusion threat determination unit performs the intrusion threat detection by calculating a similarity between an event vector of the current data set and event vectors of the false-positive data set and of the true-positive data set and by comparing the similarity with a preset threshold.

\* \* \* \* \*